{}

US008068429B2

(12) United States Patent
Rittmeyer et al.

(10) Patent No.: US 8,068,429 B2
(45) Date of Patent: Nov. 29, 2011

(54) TRANSMIT SCHEDULING

(75) Inventors: Bryan Rittmeyer, Sherman Oaks, CA (US); Alon Regev, Woodland Hills, CA (US); Gerald R. Pepper, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 463 days.

(21) Appl. No.: 11/756,460

(22) Filed: May 31, 2007

(65) Prior Publication Data

US 2008/0298380 A1    Dec. 4, 2008

(51) Int. Cl.
*H04L 12/26* (2006.01)
(52) U.S. Cl. ........................................ 370/241; 370/417
(58) Field of Classification Search .................. None
See application file for complete search history.

(56) References Cited

U.S. PATENT DOCUMENTS

| | | | |
|---|---|---|---|
| 5,247,517 A | 9/1993 | Ross et al. | |
| 5,343,463 A | 8/1994 | van Tetering et al. | |
| 5,446,738 A * | 8/1995 | Kim et al. | 370/413 |
| 5,477,531 A | 12/1995 | McKee | |
| 5,648,958 A * | 7/1997 | Counterman | 370/458 |
| 5,787,253 A | 7/1998 | McCreery et al. | |
| 5,872,769 A * | 2/1999 | Caldara et al. | 370/413 |
| 5,878,032 A | 3/1999 | Mirek et al. | |
| 5,905,713 A | 5/1999 | Anderson et al. | |
| 6,028,847 A | 2/2000 | Beanland | |
| 6,044,091 A | 3/2000 | Kim | |
| 6,233,256 B1 | 5/2001 | Dieterich et al. | |
| 6,507,923 B1 | 1/2003 | Wall et al. | |
| 6,545,979 B1 | 4/2003 | Poulin | |
| 6,601,098 B1 | 7/2003 | Case et al. | |
| 6,621,805 B1 | 9/2003 | Kondylis et al. | |
| 6,751,194 B1 * | 6/2004 | Ueno | 370/235 |
| 6,950,405 B2 | 9/2005 | Van Gerrevink | |
| 7,058,946 B2 * | 6/2006 | Acharya et al. | 718/102 |
| 2002/0191592 A1 * | 12/2002 | Rogers et al. | 370/352 |
| 2003/0123449 A1 * | 7/2003 | Kuhl et al. | 370/412 |
| 2004/0160972 A1 * | 8/2004 | Tang et al. | 370/412 |
| 2005/0047397 A1 * | 3/2005 | Sim et al. | 370/352 |
| 2005/0088970 A1 * | 4/2005 | Schmidt et al. | 370/412 |
| 2006/0023691 A1 * | 2/2006 | Franchuk et al. | 370/351 |
| 2006/0114907 A1 * | 6/2006 | Wu | 370/412 |
| 2006/0268931 A1 * | 11/2006 | Sella | 370/468 |
| 2007/0165666 A1 * | 7/2007 | Lifshitz et al. | 370/445 |
| 2007/0237069 A1 * | 10/2007 | Chang et al. | 370/208 |
| 2008/0019397 A1 * | 1/2008 | Hou | 370/498 |
| 2009/0122768 A1 * | 5/2009 | Nakashima et al. | 370/338 |

OTHER PUBLICATIONS

Shu, Zhang and Kobayashi, Katsushi, A Hardware Timestamper for One-Way Delay Measurements, Aug. 2, 2004, IPPM WG Meeting, IETF60, San Diego, California.
Zec, Marko and Mikuc, Miljenko, Real-Time IP Network Simulation at Gigabit Data Rate, Jun. 2003, Proceedings of the 7th International Conference on Telecommunications (ConTEL).

* cited by examiner

*Primary Examiner* — Chirag Shah
*Assistant Examiner* — Joshua Smith
(74) *Attorney, Agent, or Firm* — SoCal IP Law Group LLP; Steven C. Sereboff; John E. Gunther (57) ABSTRACT

There are disclosed apparatus and methods for scheduling packet transmission. At least one scheduled traffic queue holds a plurality of scheduled packets, each scheduled packet having an associated scheduled transmit time. At least one unscheduled traffic queue holds plurality of unscheduled packets. A packet selector causes transmission of scheduled packets from the scheduled traffic queue at the associated scheduled transmit time, while causing transmission of unscheduled packets from the unscheduled traffic queue during the time intervals between transmissions of scheduled packets.

18 Claims, 8 Drawing Sheets

TRANSMIT SCHEDULING

RELATED APPLICATION INFORMATION

This patent is related to copending published patent application US 2004-0177142 A1, filed Mar. 6, 2003, entitled "Dynamic Streams for Network Testing", and to copending application Ser. No. 11/557,059, filed Nov. 6, 2006, entitled "Generic Packet Generation".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. These portions may be referred to as packets, frames, cells, datagrams, or data units, all of which are referred to herein as packets. Communications networks that transmit messages as packets are called packet switched networks.

Each packet contains a portion of the original message, commonly called the body of the packet. In addition, each packet contains identification and routing information, commonly called a packet header. The packets are then sent individually over the network through multiple switches or nodes and then reassembled at a final destination using the information contained in the packet headers, before being delivered to a target device or end user. At the receiving end, the reassembled message is passed to the end user in a format compatible with the user's equipment.

The body of a packet may contain data, or may contain voice or video information. In situations where real-time video or voice information being transmitted over a packet-switch network, it is desirable that the packets be delivered at a constant rate with minimum time delay. The delay time is commonly termed "latency" and the temporal departure from a constant delivery rate is commonly termed "jitter". Methods and apparatus are needed to precisely measured latency and jitter of networks and network devices.

DETAILED DESCRIPTION

Throughout this description, the embodiments and examples shown should be considered as exemplars, rather than limitations on the apparatus and methods disclosed or claimed.

Figure 1:
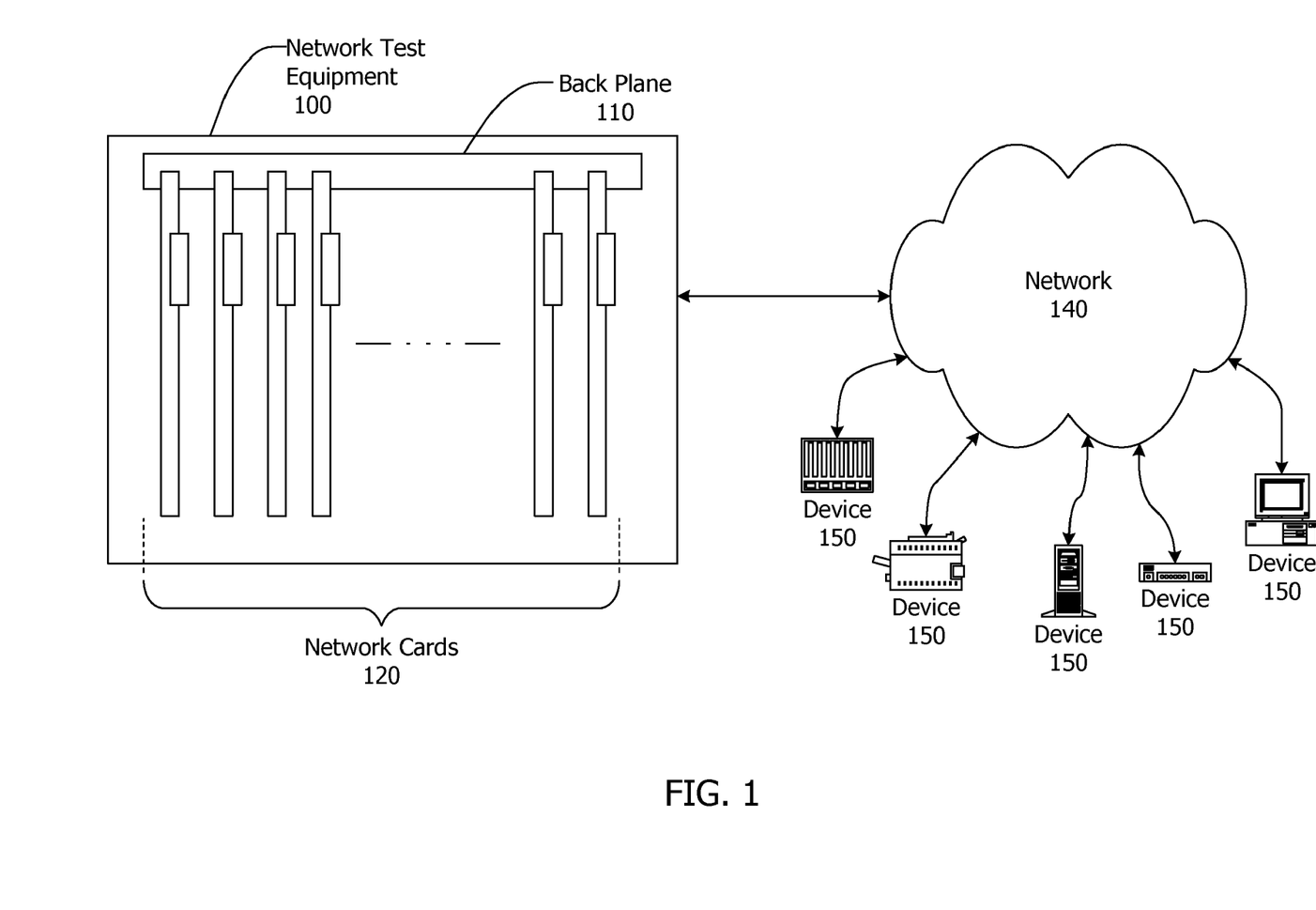
FIG. 1 is a block diagram of a network environment.

Referring now to FIG. 1, there is shown a block diagram of a network environment. The environment includes a network test equipment 100, a network 140 and plural network devices 150.

The network test equipment 100 may be a network testing device, performance analyzer, conformance validation system, network analyzer, or network management system. The network test equipment 100 may include one or more network cards 120 and a back plane 110. The network test equipment 100 may be in the form of a card rack, as shown in FIG. 1, or may be an integrated unit. Alternatively, the network test equipment 100 may comprise a number of separate units cooperative to provide traffic generation and/or analysis. The network test equipment 100 and the network cards 120 may support one or more well known standards or protocols such as the 10 Gigabit Ethernet and Fibre Channel standards, and may support proprietary protocols as well.

The network cards 120 may include one or more field programmable gate arrays (FPGA), application specific integrated circuits (ASIC), programmable logic devices (PLD), programmable logic arrays (PLA), processors and other kinds of devices. In addition, the network cards 120 may include software and firmware. The term network card encompasses line cards, test cards, analysis cards, network line cards, load modules, interface cards, network interface cards, data interface cards, packet engine cards, service cards, smart cards, switch cards, relay access cards, and the like. Each network card 120 may provide one or more network ports. The ports of the network cards 120 may be connected to the network through wire, optical fiber, wirelessly or otherwise. Each network card 120 may support a single communications protocol, may support a number of related protocols, or may support a number of unrelated protocols. The network cards 120 may be permanently installed in the network test equipment 100 or field removable. Each network card 120 may provide one or more ports.

The back plane 110 may serve as a bus or communications medium for the network cards 120. The back plane 110 may also provide power to the network cards 120.

The network devices 150 may be any devices capable of communicating over the network 140. The network devices 150 may be computing devices such as workstations, personal computers, servers, portable computers, personal digital assistants (PDAs), computing tablets, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 150 may include appliances such as refrigerators, washing machines, and the like as well as residential or commercial HVAC systems, alarm systems, and any other device or system capable of communicating over a network.

The network 140 may be a LAN, a WAN, a SAN, wired, wireless, or a combination of these, and may include or be the Internet. Communications on the network 140 may take various forms, including frames, cells, datagrams, packets or other units of information, all of which are referred to herein as packets. The network test equipment 100 and the network devices 150 may communicate simultaneously with one another, and there may be plural logical communications between the network test equipment 100 and a given network device 150. The network itself may be comprised of numerous nodes providing numerous physical and logical paths for data to travel.

A series of packets originating from a single source on the network having a specific type of packet and a specific rate will be referred to herein as a "stream." A source may support multiple outgoing and incoming streams simultaneously and concurrently, for example to accommodate multiple packet types or rates. A source may be, for example, a port on a network interface. "Simultaneously" means "at exactly the same time." "Concurrently" means "within the same time." A plurality of concurrent streams may be combined to form what will be referred to herein as a "flow". A single flow may represent a plurality of packet types. The streams within a flow share the data rate of the flow through interleaving. The interleaving may be balanced, unbalanced, and distributed among the represented streams. In modern "triple play" networks and network equipment, a flow may contain data, audio, and video streams.

Figure 2:
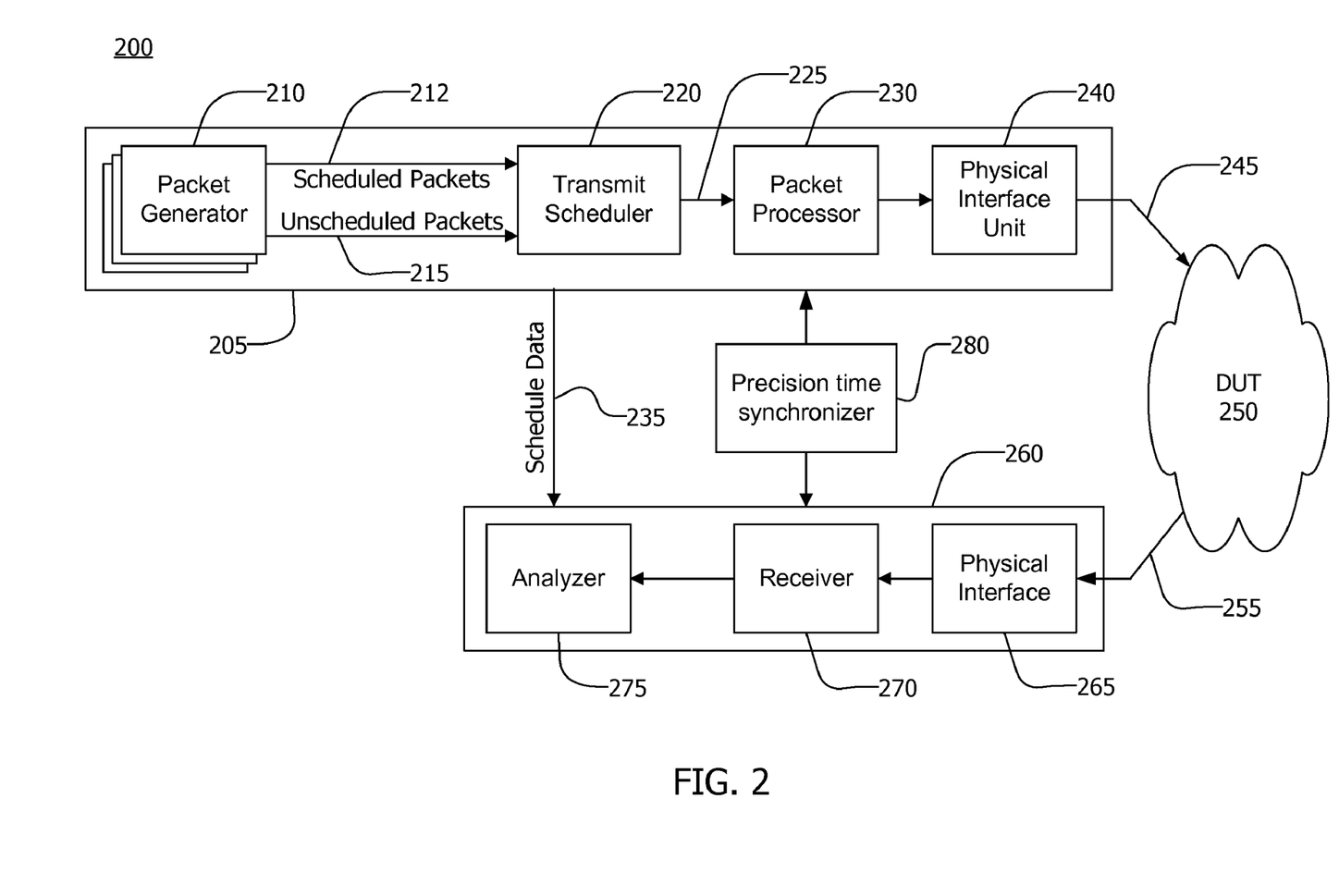
FIG. 2 is a block diagram of a system for testing a device.

Referring now to FIG. 2, there is shown a block diagram of a system 200 for testing a device under test (DUT) 250. The device under test may be a network device as previously defined or may be a network subsystem consisting of a plurality of network devices connected by a network.

The system 200 may include at least one traffic generator 205, and at least one receiver-analyzer 260. The traffic generator 205 and receiver-analyzer 260 may be included within a network test equipment such as network test equipment 100 of FIG. 1. The traffic generator 205 and receiver-analyzer 260 may be within the same unit, may be co-located but physically separate, or may be geographically separated.

The traffic generator 205 may include one or more packet generators 210 that generate one or more streams of scheduled packets 212. Within this description, a scheduled packet is a packet which, for the purpose of accurate testing, must be transmitted at a predetermined time. A stream of scheduled packets is a series of scheduled packets, each of which must be transmitted at a predetermined time. Each of the packets in a stream of scheduled packets may have an associated scheduled transmit time. When the system 200 is used for measuring latency or jitter of the DUT 250, the streams of scheduled packets may emulate real-time video or voice transmission protocols such as Real Time Protocol (RTP). The system 200 may be used to perform other tests on DUT 250, wherein the scheduled packets may emulate protocols such as Network Time Protocol, various routing protocols, and other network command and control protocols.

The one or more packet generators 210 may also generate one or more streams of unscheduled packets 215. Within this description, an unscheduled packet is any packet that is not a scheduled packet as defined previously. Generally, unscheduled packets may not have to be transmitted at a specific time and may not have an associated scheduled transmit time. One or more streams of unscheduled packets may emulate non-time-critical network traffic such as Web page retrieval and file transfers using TCP/IP, UDP/IP, and other protocols.

The traffic generator may include at least one transmit scheduler 220, at least one packet processor 230, and a physical interface 240. The transmit scheduler 220 may function to ensure that each scheduled packet is transmitted precisely at its associated transmit time, while causing unscheduled packets to be transmitted on a "time available" basis interleaved with the scheduled packets. The transmit scheduler may interleave multiple scheduled and unscheduled packet streams. The transmit scheduler 220 may ensure that each scheduled packet is essentially equal to its associated transmit time. With this description, "essentially equal" means equal within a predetermined tolerance. The tolerance may be small compared to the anticipated latency and jitter of the DUT 250. The tolerance may be small compared to the transmit timing accuracy required to satisfy Quality of Service (QoS) requirements in ATM networks and other networks. The tolerance may be less than 1 microsecond. An example transmit scheduler will be discussed in detail subsequently.

The output from the transmit scheduler may be a flow 225 of scheduled and unscheduled packets. The packet processor 230 may perform a variety of packet processing operations including checksum calculation, encryption, and other processes. The physical interface unit 240 may convert the flow of processed packets into electrical or optical signals appropriate for transmission over a network connection 245 to the DUT 250. The physical interface unit 240 may perform other functions such as parallel to serial conversion, 8 bit to 10 bit encoding, or 64 bit to 66 bit encoding.

The receiver-analyzer 260 may include a second physical interface unit 265, a receiver unit 270, and an analyzer unit 275. The second physical interface unit 265 may receive a flow of packets from the DUT 255 over a network link 255, and may covert the optical or electrical signals used on the network to a form suitable for processing within the receiver-analyzer 260. The second physical interface unit 265 may also perform other functions such as decoding and serial to parallel conversion. The receiver 270 may assign a time stamp to each received packet. Alternately, receiver 270 may identify scheduled packets from the packet content and assign a time stamp only to scheduled packets. Receiver 270 may perform other operations on received packets including decryption, checksum verification, and other packet processing operations.

The analyzer 275 may receive schedule data from the traffic generator 205 by means of a link 235. In the case where the traffic generator 205 and receiver-analyzer are located within the same equipment, such as network test equipment 100 of FIG. 1, the link 235 may be an internal bus or other connection. In other cases, the link 235 may be a dedicated direct connection, or a connection by means of the same network used for testing DUT 250 or another network.

In order to accurately determine the delay time, or latency, of DUT 250, the traffic generator 205 and the receiver-analyzer 260 may be synchronized by a precision time synchronizer 280. In the case where the traffic generator 205 and receiver-analyzer are located within the same equipment, such as network test equipment 100 of FIG. 1, the precision time base 280 may simply be a real-time clock shared by the traffic generator 205 and the receiver analyzer 260. In other cases, the precision time base 280 may be a separate unit or may be a component of the traffic generator 205, or the receiver-analyzer 260, or both. The time synchronization may be accomplished by separate absolute time clocks, such as atomic clocks, for the traffic generator 205 and the receiver-analyzer 260. The time synchronization may be accomplished by dedicated direct connections between a single precision time base 280, the traffic generator 205 and the receiver-analyzer 260, or by connections by means of the same network used for testing DUT 250 or another network. The time synchronization may be accomplished by the traffic generator 205 and the receiver-analyzer 260 both acquiring time information from a common source such as the Global Positioning Satellite (GPS) system, or from a cellular communication system.

The analyzer 275 may determine a latency for each scheduled packet from the time stamps applied by the receiver 270 and the schedule data provided by the traffic generator 205. The analyzer 275 may determine an average latency and a variation in latency, or jitter, of the DUT 250 by analyzing the latencies of a plurality of scheduled packets. The received packet flow may included multiple streams of scheduled packets, which may be of the same or different types. The analyzer 275 may determine the latency and jitter of DUT 250 for each stream of scheduled packets.

Figure 3:
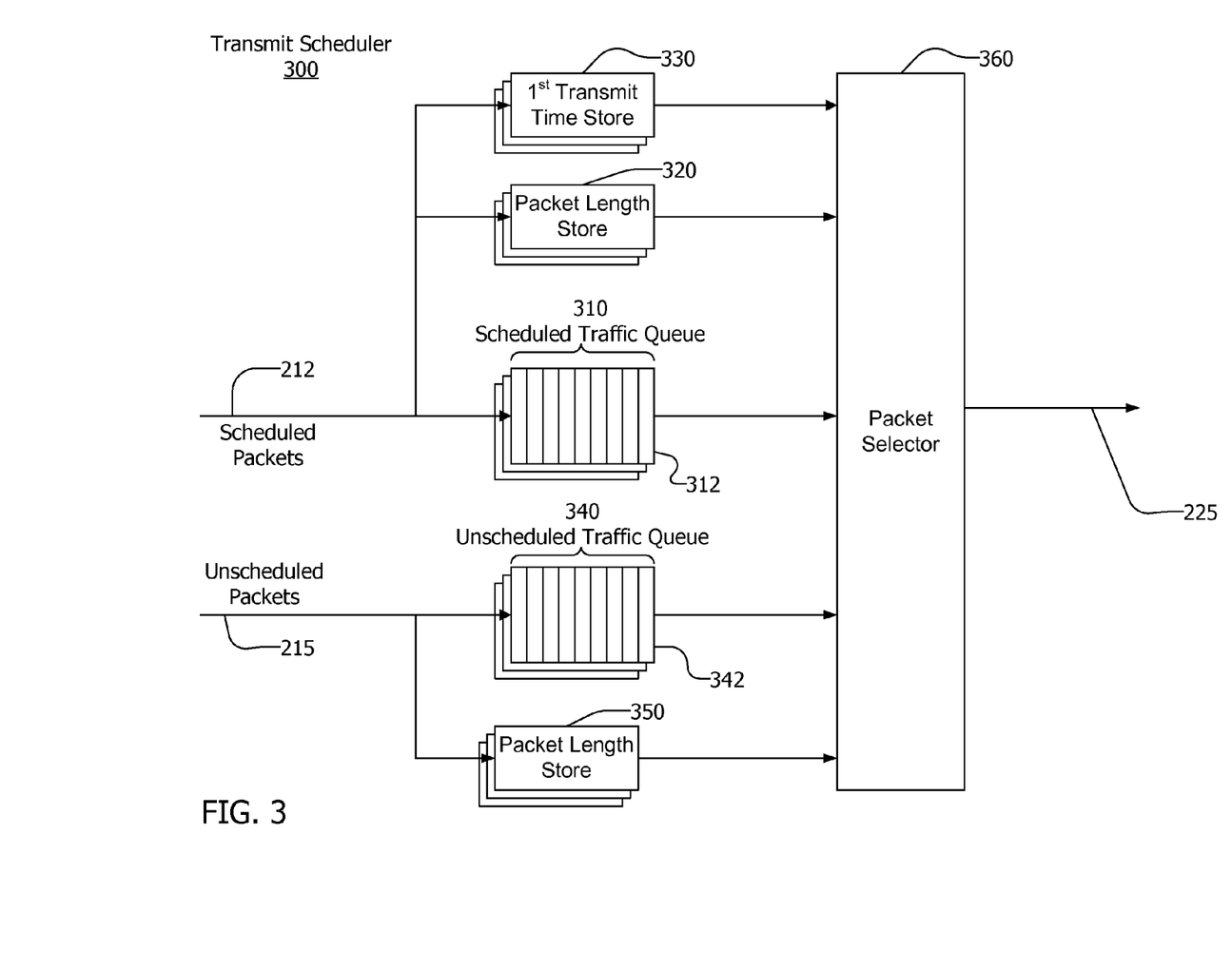
FIG. 3 is a block diagram of a transmit scheduler.

FIG. 3 is a block diagram of a transmit scheduler 300 that may be suitable for use in the system of FIG. 2. The transmit scheduler 300 may include at least one scheduled traffic queue 310 that receives and holds one or more streams of scheduled packets 212. The scheduled traffic queue 310 may be capable of holding a plurality of packets. The scheduled traffic queue 310 may operate as a first-in-first-out (FIFO) queue. The scheduled traffic queue 310 may be implemented as a FIFO register or may be implemented in a memory using an address table, address pointers, or some other means to define the locations of packets in the memory. The scheduled traffic queue 310 may have, by definition, a head end where the next packet to be transmitted 312 is held.

The transmit scheduler 300 may include a plurality of scheduled traffic queues, each of which may be capable of holding a plurality of packets. Each scheduled traffic queue may include a next packet to be transmitted held at the head of the queue. There may be a separate scheduled traffic queue for each stream of scheduled packets.

The transmit scheduler 300 may include at least one transmit time store 330 for holding the scheduled transmit times associated with the scheduled packets held in the scheduled traffic queue 310. Within this description, a "store" is short term memory, and "holding" means storing for a short term. The transmit time store 330 may operate as a FIFO queue.

In the case where the transmit scheduler 300 includes multiple scheduled traffic queues, there may be multiple transmit time stores. The number of transmit time stores may be equal to, smaller than, or greater than the number of scheduled traffic queues. There may be a dedicated transmit time store for each scheduled traffic queue.

The transmit scheduler 300 may include at least one packet length store 320 for holding the lengths of the scheduled packets held in the scheduled traffic queue 310. The packet length store 330 may operate as a FIFO queue. The lengths of packets in the scheduled traffic queue may be received from the packet generator 210 along with the packet, or may be determined by counting the length of the packet as the packet is placed into the scheduled traffic queue 310. The lengths of packets in the schedule traffic queue 310 may also be determined from the headers of the packets, or by analyzing the addresses of successive packets stored in the schedule traffic queue 310.

In the case where the transmit scheduler 300 includes multiple scheduled traffic queues, there may be multiple packet length stores. The number of packet length stores may be equal to, smaller than, or greater than the number of scheduled traffic queues. There may be a dedicated packet length store for each scheduled traffic queue.

The transmit scheduler 300 may include at least one unscheduled traffic queue 340 that receives and holds one or more streams of unscheduled packets 215. The unscheduled traffic queue 340 may be capable of holding a plurality of packets. The unscheduled traffic queue 340 may operate as a first-in-first-out (FIFO) queue. The unscheduled traffic queue 340 may be implemented as a FIFO register or may be implemented in a memory using an address table, address pointers, or some other means to define the locations of packets in the memory. The unscheduled traffic queue 340 may have, by definition, a head end where the next packet to be transmitted 342 is held.

The transmit scheduler 300 may include a plurality of unscheduled traffic queues, each of which may be capable of holding a plurality of packets including a next packet to be transmitted held at the head of the queue. There may be a separate unscheduled traffic queue for each stream of unscheduled packets.

The transmit scheduler 300 may include at least one packet length store 350 for holding the lengths of the unscheduled packets held in the unscheduled traffic queue 340. The packet length store 350 may operate as a FIFO queue. The lengths of packets in the unscheduled traffic queue may be received from the packet generator 210 along with the packet, or may be determined by counting the length of the packet as the packet is placed into the scheduled traffic queue 340. The lengths of packets in the schedule traffic queue 340 may also be determined from the headers of the packets, or by analyzing the addresses of successive packets stored in the schedule traffic queue 340.

In the case where the transmit scheduler 300 includes multiple unscheduled traffic queues, there may be multiple packet length stores. The number of packet length stores may be equal to, smaller than, or greater than the number of unscheduled traffic queues. There may be a dedicated packet length store for each unscheduled traffic queue.

The transmit scheduler 300 may include a packet selector 360 which functions to select unscheduled packets from the at least one unscheduled traffic queue 340 for transmission between transmissions of scheduled packets. The packet selector 360 may function to provide a flow 225 in which the intervals between scheduled packets are filled with unscheduled packets to the extent possible while transmitting each scheduled packet at its associated transmit time.

Figure 4:
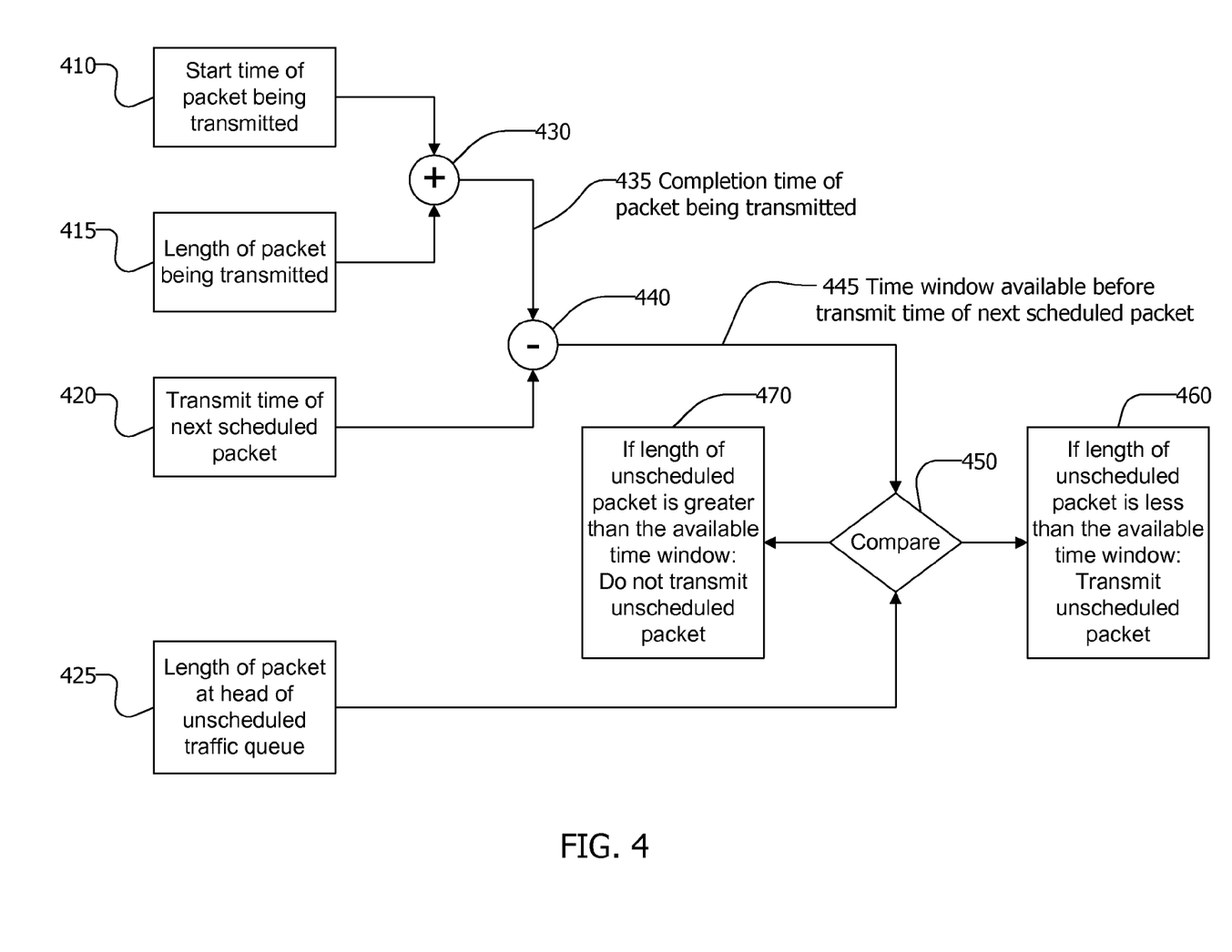
FIG. 4 is a logic diagram of a packet selector.

FIG. 4 is an exemplary diagram of the logical operations that may be performed by a packet selector such as the packet selector 360 of FIG. 3. While FIG. 4 has the appearance of a flow chart, the logical operations may be performed by hardware or a combination of hardware and firmware. The hardware or hardware/firmware combination may be initialized by software at the start of each testing session. The example of FIG. 4 assumes that the transmit timer includes only a single unscheduled traffic queue. At 430, the completion time of a packet currently being transmitted 435 may be determined by adding the start time of the packet currently being transmitted 410 and the length of the packet currently being transmitted 415. Within this description, the length of a packet is defined by the time required to transmit the packet, which can be easily related to the length of the packet in bits or bytes given the known data rate of the flow 225 (in FIG. 3).

At 440, the length of a time window 445 available for transmission of unscheduled packets may be determined by subtracting the completion time of the packet currently being transmitted 435 from the transmit time 420 associated with the next scheduled packet to be transmitted. The transmit time 420 may be obtained from a transmit time store associated with a scheduled traffic queue.

At 450, the length of the unscheduled packet at the head of the unscheduled traffic queue 425 may be compared to the length of the time window 445. The length of the unscheduled packet at the head of the unscheduled traffic queue 425 may be obtained from a packet length store associated with the unscheduled traffic queue, or may be obtained from the header of the unscheduled packet, or by some other method. If the length of the unscheduled packet at the head of the unscheduled traffic queue 425 is shorter than the time window 445, the unscheduled packet may be transmitted 460 without delaying the transmission of the next scheduled packet. If the length of the unscheduled packet at the head of the unscheduled traffic queue 425 is longer than the time window 445, the unscheduled packet may not be transmitted 470, since to do so would delay the next scheduled packet.

Figure 5:
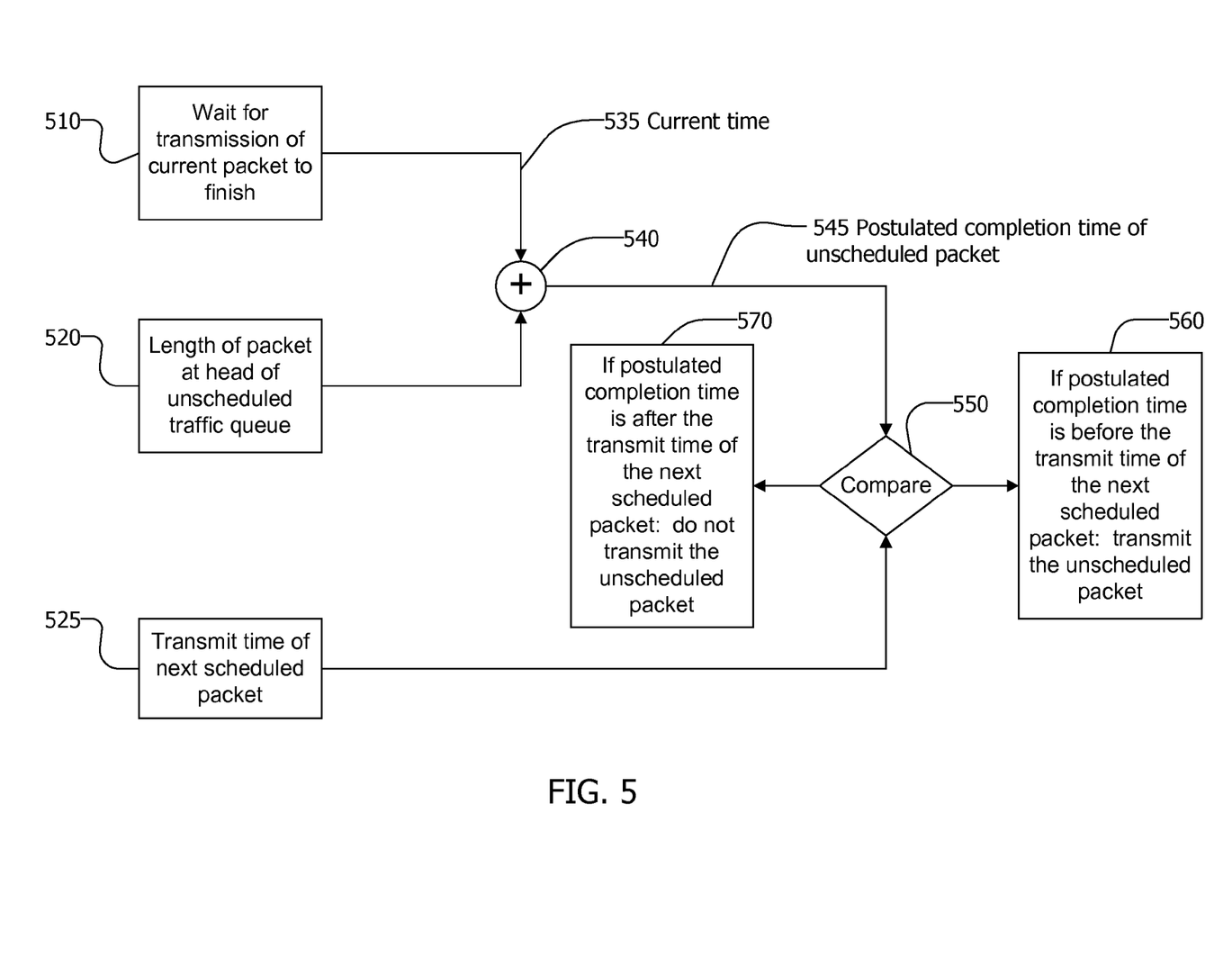
FIG. 5 is a logic diagram of a packet selector.

FIG. 5 is another exemplary diagram of the logical operations that may be performed by a packet selector such as the packet selector 360 of FIG. 3. The example of FIG. 5 also assumes that the transmit timer includes only a single unscheduled traffic queue. At 530, the completion time of a packet currently being transmitted 535 may be determined by the simple expedient of waiting until the transmission of the current packet is completed. A traffic generator that always waits for the transmission of each current packet to be completed before selecting the next packet may not required a scheduled packet length store.

At 540, the postulated completion time of the packet at the head of the unscheduled traffic queue 545 may be determined by adding the current time 535 to the length of the unscheduled packet at the head of the unscheduled traffic queue 520. The packet length 520 may be obtained from a packet length store associated with the unscheduled traffic queue, or from the header of the unscheduled packet, or by some other method.

At 550, the postulated completion time of the unscheduled packet at the head of the unscheduled traffic queue 545 may be compared to the transmit time for the next scheduled packet to be transmitted 525. If the postulated completion time for the unscheduled packet at the head of the unscheduled traffic queue 545 is earlier than the transmit time of the next scheduled packet 525, the unscheduled packet may be transmitted 560 without delaying the transmission of the next scheduled packet. If the postulated completion time of the unscheduled packet at the head of the unscheduled traffic queue 545 is after the transmit time of the next scheduled packet 525, the unscheduled packet may not be transmitted 570, since to do so would delay the next scheduled packet.

The operation of a packet selector may be more complex than the examples of FIG. 4 and FIG. 5 if the packet selector is a portion of a transmit scheduler that includes multiple scheduled traffic queues and/or multiple unscheduled traffic queues. When the transmit scheduler includes multiple scheduled traffic queues, the packet selector may compare the transmit times of the packets at the heads of the multiple scheduled traffic queues to identify the next scheduled packet to be transmitted. The packet selector may also implement scheduled traffic priority rules in the situation where packets from two or more scheduled traffic queues require simultaneous transmission or otherwise conflict. The scheduled traffic priority rules may include rules for dropping or delaying conflicting packets, and rules for providing error messages or alerts in the event of scheduled packet conflicts.

Figure 6:
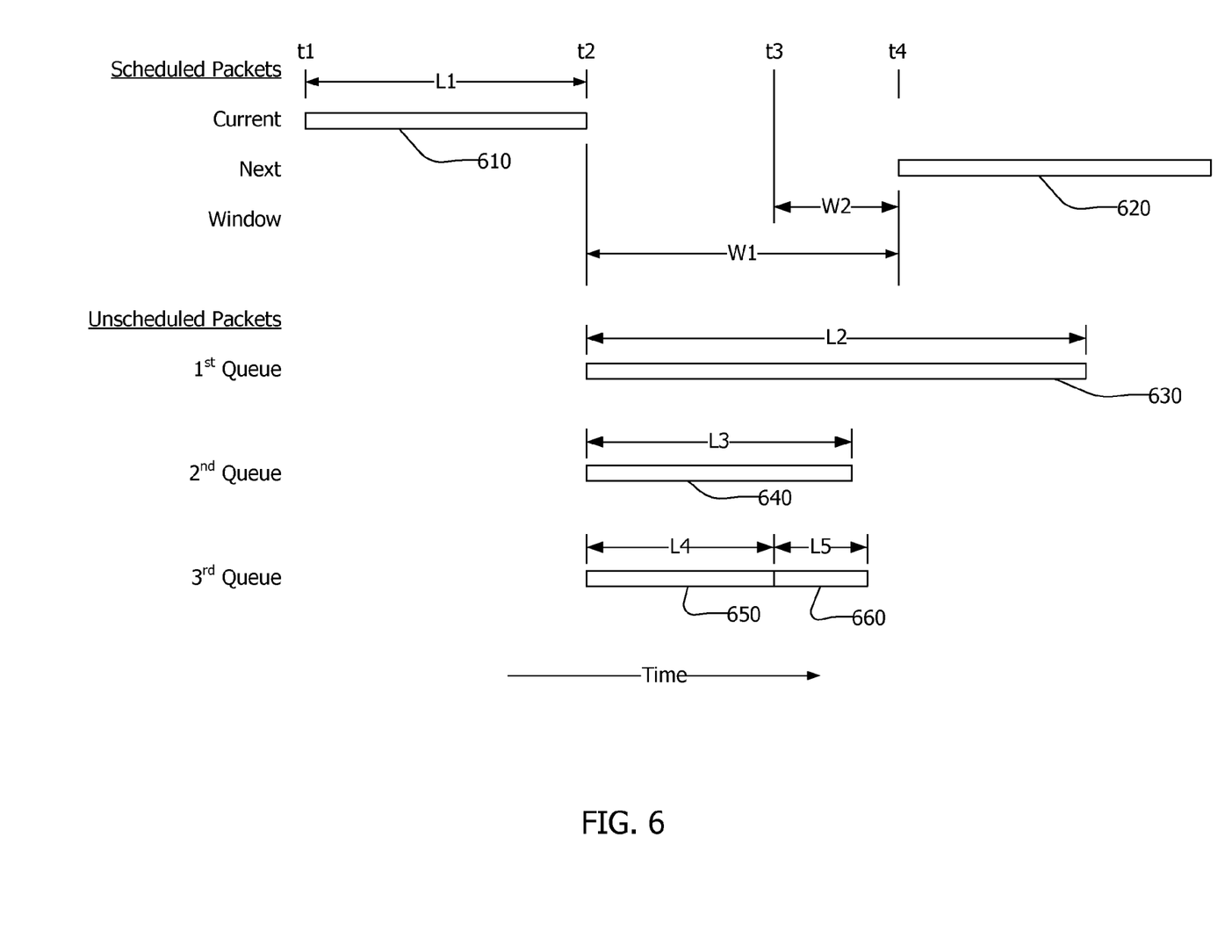
FIG. 6 is a timing diagram for a packet selector.

When the transmit scheduler includes multiple unscheduled traffic queues, the packet selector may implement unscheduled packet priority rules to select packets from transmission from the multiple queues. The operation of a packet selector and multiple unscheduled traffic queues may be understood from the exemplary timing diagram of FIG. 6. In FIG. 6, the transmission of a current scheduled packet 610 begins at a time t1. The current scheduled packet 610 has a length L1 (defined in terms of the time required to transmit the packet) such that the transmission of the current scheduled packet 610 will conclude at a time t2=t1+L1. A next scheduled packet 620 has an associated transmit time t4. Between the end of transmission t2 of the current packet 610 and the transmit time t4 of the next scheduled packet is a first time window in which unscheduled packets may be transmitted. The length of the time window is W1=t4−t2.

In the example of FIG. 6, the packet selector may select unscheduled packets from first, second, and third unscheduled traffic queues. In this example, the packet 630 at the head of the first unscheduled packet queue has a length L2 which is longer than the length W1 of the available time window. Packet 630 may not be transmitted, since to do so would delay the transmission for next scheduled packet 620 at time t4. The packet 640 at the head of the second unscheduled packet queue has a length L3 which is less than the length W of the available time window. Similarly, the packet 650 at the head of the second unscheduled packet queue has a length L4 which is less than the length W of the available time window. Either packet 640 or packet 650 may be transmitted during the available time window.

The packet selector may apply unscheduled traffic priority rules to select either unscheduled packet 640 or unscheduled packet 650 for transmission after scheduled packet 610. The unscheduled traffic priority rules may be fixed in the packet selector, or may loaded into the packet selector at the start of each test session. The unscheduled traffic priority rules may assign fixed priorities to specific queues. For example, the priority rules may require that packets will be selected from the second queue in preference to the third queue whenever possible. The priority rules may assign priorities according to a fairness principle, such as attempting to select a packet from the unscheduled traffic queue holding the most packets, or from the unscheduled traffic queue holding the unscheduled packet that has been waiting the longest time. The unscheduled traffic priority rules may combine these and other principles to determine which unscheduled packet is selected for transmission.

If the packet selector selects unscheduled packet 650 from the third unscheduled traffic queue for transmission after scheduled packet 610, the transmission of unscheduled packet 650 will end at a time t3=t2+L4. In this case, the packet selector may determine that a second window of length W2=t4−t3 is now available. In this example, it will be possible to also transmit the unscheduled packet 560, which follows unscheduled packet 550 in the third unscheduled traffic queue, during the available time window.

The packet selector may or may not have visibility of the lengths of unscheduled packets behind the packets at the head of each queue. If the packet selector has visibility of the lengths of more than just the head-end packet in each unscheduled traffic queue, the packet selector may initially select multiple unscheduled packets to fill window W1, or may iteratively elected unscheduled packets to fill a succession of time windows from the completion of the packet currently being transmitted to the transmit time of the next scheduled packet. The ability to transmit multiple packets during a window may also be considered in the unscheduled traffic priority rules.

The logic and timing shown in FIGS. 4-6 are illustrative examples of logic that may be used to select unscheduled packets to fill the intervals between scheduled packets to the extend possible, given the unscheduled packets that are available from the unscheduled traffic queue or queues. Any logic or algorithm that selects unscheduled packets to fill the intervals between scheduled packets without delaying transmission of scheduled packets may be used.

Figure 7:
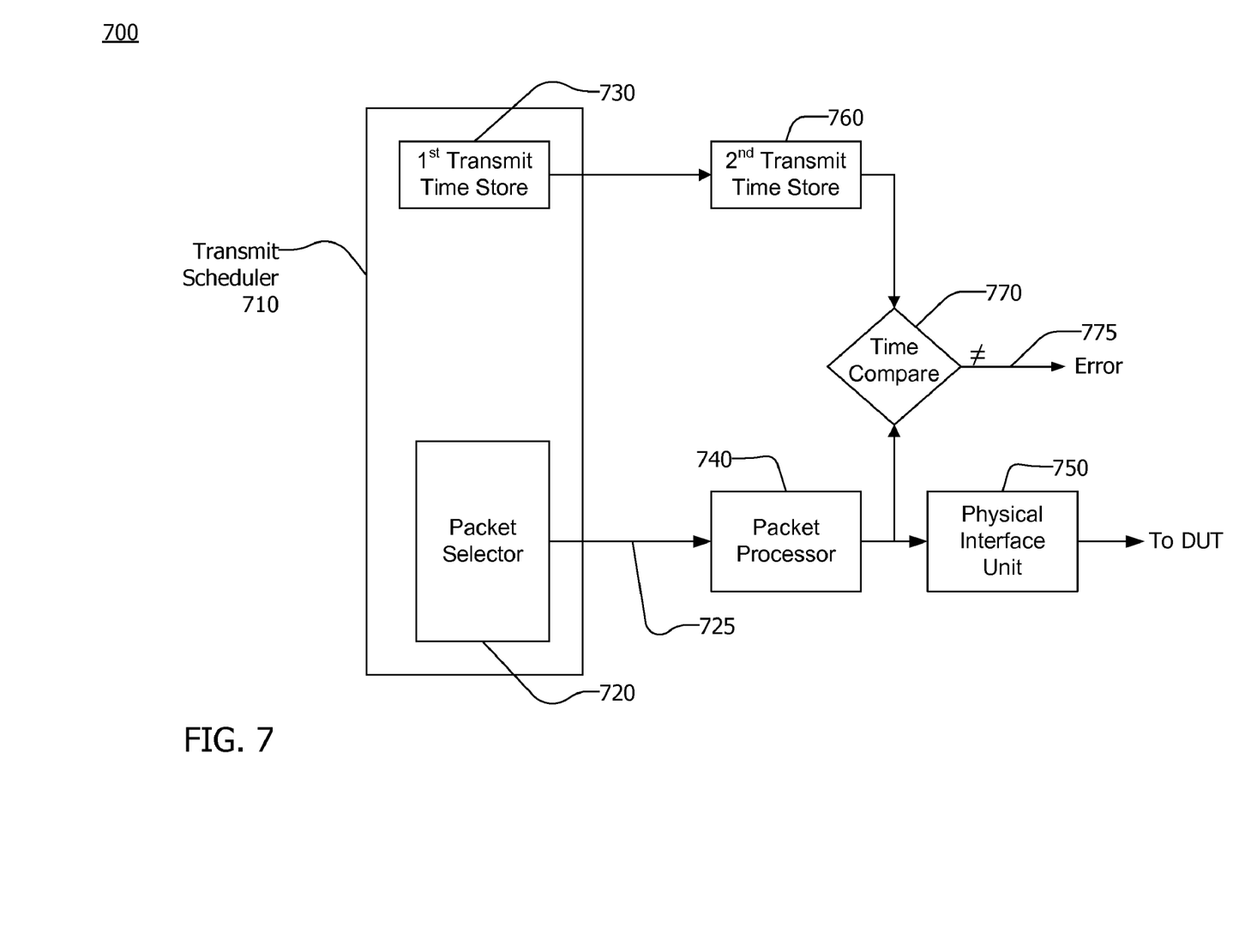
FIG. 7 is a block diagram of a portion of a transmit schedule.

FIG. 7 is a partial block diagram of a traffic generator 700 similar to traffic generator 205 of FIG. 2. The traffic generator 700 may include a transmit scheduler 710, first transmit time store 730, and packet selector 720 which may function as described for transmit scheduler 300, transmit time store 330 and packet selector 360 of FIG. 3.

A packet processor 740 may receive a packet flow 725 of interleaved scheduled and unscheduled packets from the packet selector 720. The packet processor 740 may perform processes on packets prior to transmission via a physical interface unit 750. The packet processor 740 may perform processes including encryption and checksum calculation. Since a certain time may be required to perform such processes, packet processor 740 may delay the packet flow 725. The physical interface unit 750 may also introduce a delay. The delay time, or latency, of the packet processor 740 and the physical interface unit 750, may be compensated. The packet selector 720 may provide each scheduled packet to the packet processor 740 in advance of the associated transmit time by a time interval equal to the latency of the packet processor and the physical interface unit.

The latency of the packet processor 740 and physical interface unit 750 may be constant for all packets, or may have a predictable dependency on the packet type or the packet length. The packet selector 720 may be configured to compensate for fixed or predictable latency.

The traffic generator 700 may include a second transmit time store 760 that holds the transmit times associated with scheduled packets being processed by the packet processor 740. The second transmit time store 760 may receive the transmit times from the first transmit time store 730 as the packet are provided from the packet selector 720 to the packet processor 750. The second transmit time store may function as a FIFO queue. A time comparator 775 may compare the intended transmit time of each scheduled packet, from the second transmit time store 760, with the actual transmit time after the packet processing is competed. The time comparator 775 may provide an error signal or message if the actual transmit time deviates from the intended transmit time by more than a predetermined tolerance.

A traffic generator, transmit scheduler, or packet selector apparatus may include a processor, hardwired logic, programmable gate arrays, or application specific integrated circuits. The traffic generator, transmit scheduler, and packet selector may be hardware, or may be hardware in combination with software and/or firmware. Additional and fewer units, modules or other arrangement of software, hardware and data structures may be used to achieve the processes and apparatuses described herein.

Figure 8:
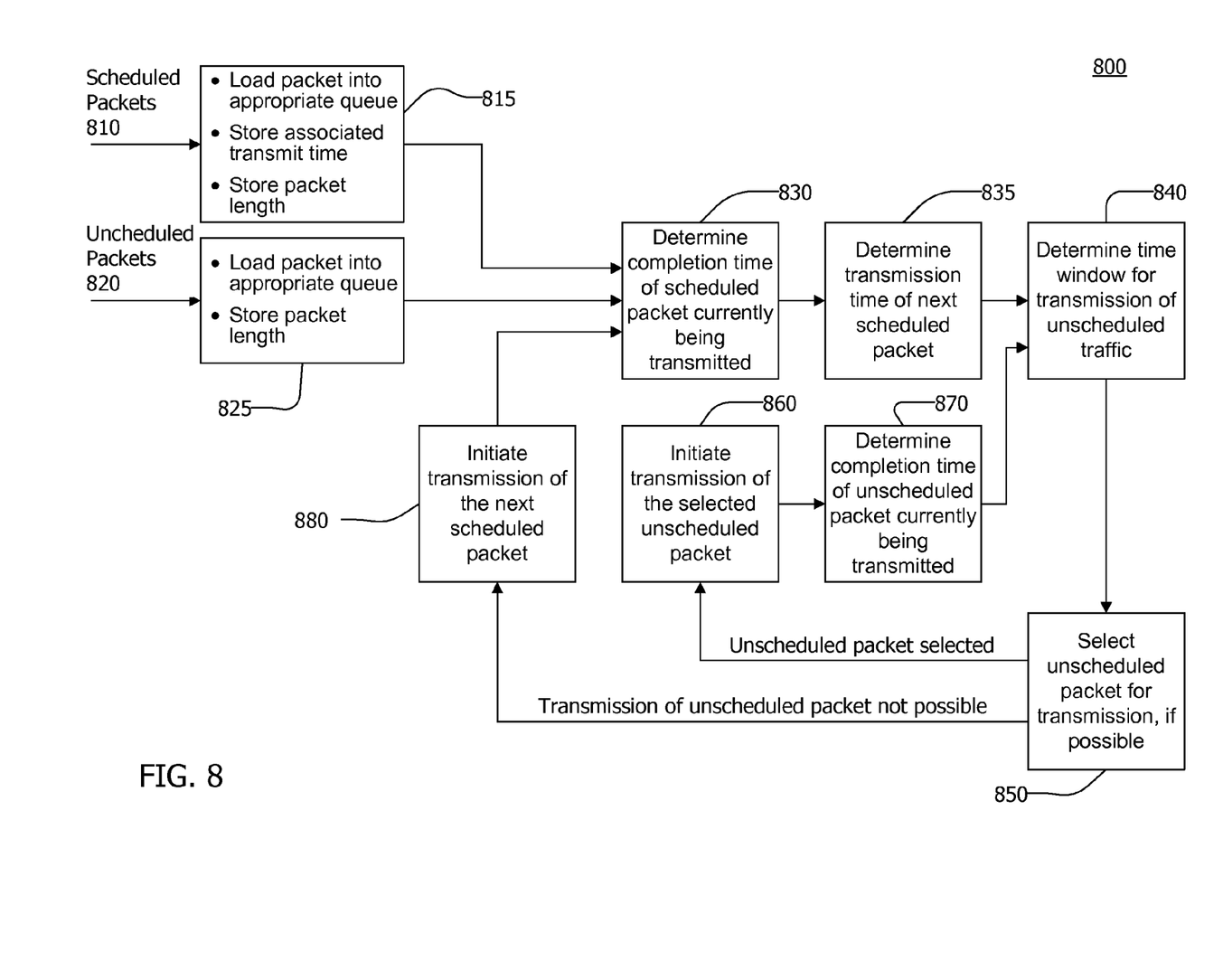
FIG. 8 is a flow chart of a method for scheduling packets for transmission.

Referring now to FIG. 8, a process 800 for scheduling packet transmission is shown. The process 800 is compatible with the transmit scheduler 300 of FIG. 3, but may be performed by other apparatus. The process 800 begins with the arrival of a first scheduled or unscheduled packet and continues until there are no packets to be transmitted.

At block 815, scheduled packets arriving in one or more streams 810 may be loaded into one or more scheduled traffic queues. Additionally, the transmit time associated with each scheduled packet may be stored in one or more transmit times stores. The length of each scheduled packet may be stored in one or more scheduled packet length stores. At block 825, unscheduled packets arriving in one or more streams 820 may be loaded into one or more unscheduled traffic queues. Additionally, the length of each unscheduled packet may be stored in one or more unscheduled packet length stores.

The process steps from block 830 to block 880 loop continuously so long as there are packets available in any traffic queue. At block 830, the completion time of a scheduled packet currently being transmitted may be determined. The completion time may be predicted by adding a known transmission start time to the length of the packet being transmitted. The length of the packet being transmitted may be a value obtained from one of the packet length stores, or may be retrieved from the packet header as the packet is transmitted. The completion time of the packet currently being transmitted can also be obtained by waiting until the transmission is complete. At block 835, the transmit time of the next scheduled packet may be determined. In a system with only a single scheduled traffic queue, the next scheduled packet will be at the head of the queue, and the associated transmit time may be at the head of the transmit time store. In a system with multiple scheduled traffic queues and multiple transmit time stores, the transmit time stores may be searched to determine the transmit time associated with the next scheduled packet. The processes of block 830 and 835 may be done in either order or concurrently.

At block 840, the length of the available time window for transmission of unscheduled packets is determined. The length of this time window is the difference between the transmit time of the next scheduled packet determined at block 835 and either the predicted completion time of the packet currently being transmitted from block 830 or the current time if the transmission of the current packet is completed.

At block 850, an unscheduled packet may be selected for transmission, if an unscheduled packet that can be transmitted during the available time window is available. If unscheduled packets are stored in a single unscheduled traffic queue, the packet at the head of the queue may be transmitted if its length is less than the available time window. If unscheduled packets are stored in a plurality of unscheduled traffic queues, unscheduled traffic priority rules may be applied to select a packet for transmission, as described in conjunction with FIG. 6.

If an unscheduled packet is selected for transmission at block 850, the transmission of the selected unscheduled packet may be initiated at block 860. Initiating the transmission of the selected packet may release the packet to a packet processor, such as packet processor 230 of FIG. 2, for processing prior to actual transmission.

After, or coincident with, block 860, the completion time of the selected unscheduled packet may be determined at block 870. The completion time of the selected unscheduled packet may be determined by adding the length of the selected unscheduled packet to the known time at which transmission was initiated.

The completion time of the selected unscheduled packet may then be used at block 840 to determine a new time window for transmission of additional unscheduled packets. The length of the new time window will be shorter than the length of the previously determined time window by an amount equal to the length of the selected unscheduled packet. The process may continue to loop through blocks 840, 850, 860, and 870 until the available time window has been reduced to a length shorter than the length of any available unscheduled packet. At this point, the time window between the previous scheduled packet and the next scheduled packet will have been filled with transmission of unscheduled packets to the extent possible.

If no available packet can be transmitted during an available window, the process may continue to block 880, where the transmission of the next scheduled packet may be initiated. Note that the process may pause at block 880 as necessary to transmit the next scheduled packet at the associated transmit time. The process may then continue to block 830 and loop continuously as described until there are no further packets to be transmitted.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A traffic generator for providing a packet stream to measure jitter of a network under test, the traffic generator comprising:
    at least one packet generator to generate scheduled and unscheduled packets;
    a transmit scheduler comprising:
    at least one scheduled traffic queue for holding scheduled packets generated by the at least one packet generator,
    a first transmit time store for storing scheduled transmit times associated respectively with the scheduled packets held in the at least one scheduled traffic queue,
    at least one unscheduled traffic queue for holding unscheduled packets generated by the at least one packet generator, and
    a packet selector coupled to the at least one scheduled traffic queue, the transmit time store, and the at least one unscheduled traffic queue;
    a packet processor that receives scheduled and unscheduled packets from the packet selector and processes the received packets prior to transmission; and
    a physical interface unit that transmits packets from the packet processor over an interface,
    wherein
    the packet selector provides scheduled packets to the packet processor in advance of the respective scheduled transmit times by an amount equal to a latency of the packet processor and the physical interface unit, such that each scheduled packet is transmitted at the respective scheduled transmit time within a tolerance that is smaller than an anticipated jitter of the network under test, and
    the packet selector causes transmission of unscheduled packets during time intervals between transmissions of scheduled packets.

2. The traffic generator of claim 1, wherein the process performed by the packet processor are one more process selected from the group consisting of checksum calculation, encryption, and any other process having a predictable latency.

3. The traffic generator of claim 1, wherein the packet processor and the physical interface unit have a constant latency for all packets.

4. The traffic generator of claim 1, wherein the packet processor and the physical interface unit have a latency that is, at least in part, dependent on the length of the packet being processed.

5. The traffic generator of claim 1, further comprising:
    a second transmit time store for holding the scheduled transmit times associated with scheduled packets being processed by the packet processor; and
    a transmit time comparator to compare the scheduled transmit time from the second transmit time store with an actual transmit time of each scheduled packet.

6. A system for testing a device, the device under test connected to the system by means of a network, the system comprising:
    a traffic generator for providing a packet stream containing scheduled and unscheduled packets, the traffic generator comprising:
    at least one packet generator to generate scheduled and unscheduled packets;
    a transmit scheduler comprising:
        at least one scheduled traffic queue for holding scheduled packets generated by the at least one packet generator,
        a transmit time store for storing scheduled transmit times associated respectively with the scheduled packets in the at least one scheduled traffic queue,
        at least one unscheduled traffic queue for holding unscheduled packets generated by the at least one packet generator, and
        a packet selector coupled to the at least one scheduled traffic queue, the transmit time store, and the unscheduled traffic queue;
    a packet processor that receives scheduled and unscheduled packets from the packet selector and processes the received packets prior to transmission; and
    a physical interface unit that transmits packets from the packet processor to the device under test via the network; and
    a receiver-analyzer that receives the scheduled and unscheduled packets from the device under test via the network and determines a latency time for each scheduled packet,
    wherein
    the packet selector provides scheduled packets to the packet processor in advance of the respective scheduled transmit times by an amount equal to a latency of the packet processor and the physical interface unit, such that each scheduled packet is transmitted at the respective scheduled transmit time within a tolerance that is smaller than an anticipated jitter of the device, and the packet selector causes transmission of unscheduled packets during time intervals between transmissions of scheduled packets.

7. The system for testing a device of claim 6, further comprising:

a link to convey scheduled transmit time data from the traffic generator to the receiver-analyzer.

8. The system for testing a device of claim 6, further comprising:

a precision time synchronizer to synchronize the traffic generator and the receiver-analyzer.

9. A method for generating test traffic to measure jitter of a network under test, comprising:

holding scheduled packets in at least one scheduled traffic queue;

storing scheduled transmit times respectively associated with the scheduled packets held in the scheduled traffic queue in a transmit time store;

holding unscheduled packets in at least one unscheduled traffic queue, the next unscheduled packet being held at a head of the unscheduled traffic queue;

processing packets from the at least one scheduled traffic queue and the at least one unscheduled traffic queue by a packet processor; and transmitting processed packets from the packet processor to the network under test via a physical interface unit, wherein each scheduled packet from the at least one scheduled traffic queue is input to the packet processor in advance of the respective scheduled transmit time by a time interval equal to a latency of the packet processor and the physical interface unit such that each scheduled packet is transmitted from the physical interface unit at the associated scheduled transmit time within a tolerance that is smaller than an anticipated jitter of the network under test, and unscheduled packets from the at least one unscheduled traffic queue are transmitted during time intervals between transmission of scheduled packets.

10. The method for generating test traffic of claim 9, wherein the transmission of unscheduled packets fills the time intervals between transmissions of scheduled packets to the extent possible without delaying the transmission of scheduled packets.

11. The method for generating test traffic of claim 9, further comprising:

determining a duration of a time window between the completion of transmission of a packet currently being transmitted and the scheduled transmit time of the next scheduled packet to be transmitted; and if the unscheduled packet at the head of the at least one unscheduled traffic queue can be transmitted within the time window, causing transmission of the unscheduled packet at the head of the unscheduled traffic queue.

12. The method for generating test traffic of claim 9, further comprising:

holding the lengths of packets in the at least one scheduled traffic queue and the unscheduled traffic queue in scheduled and unscheduled packet length stores, respectively.

13. The method for generating test traffic of claim 9, wherein the at least one unscheduled traffic queue comprises a plurality of unscheduled traffic queues, and the method further comprising using unscheduled traffic priority rules to select unscheduled packets from the heads of the plurality of unscheduled traffic queues for transmission.

14. The method for generating test traffic of claim 9, wherein the at least one scheduled traffic queue comprises a plurality of scheduled traffic queues, and the method further comprising using scheduled traffic priority rules to select a scheduled packet from the plurality of scheduled traffic queues in situations where the scheduled transmit times for packets from two or more scheduled traffic queues conflict.

15. A method for forming a packet stream to measure jitter of a network under test, the method comprising:

holding scheduled packets to be transmitted in one or more scheduled traffic queues;

storing scheduled transmit times respectively associated with the scheduled packets in the one or more scheduled traffic queues in a transmit time store;

holding unscheduled packets to be transmitted in one or more unscheduled traffic queues;

selecting packets for transmission from the one or more scheduled traffic queues and the one or more unscheduled traffic queues; and processing each selected packet by a packet processor prior to transmission, the processing having a latency, wherein selecting packets for transmission further comprises:

providing each scheduled packet from the one or more scheduled traffic queues to the packet processor in advance of the associated scheduled transmit time by a time interval equal to the latency such that each schedule packet may be transmitted at the respective transmit time within a tolerance that is smaller than an anticipated jitter of the network under test;

determining a duration of a time window between the completion of transmission of a packet currently being transmitted and the scheduled transmit time of the next scheduled packet to be transmitted; and selecting one or more unscheduled packets that can be transmitted within the time window.

16. The method of claim 15, further comprising:

holding the lengths of packets in the one or more scheduled traffic queues and the one or more unscheduled traffic queues in a scheduled packet length store and an unscheduled packet length store, respectively.

17. The method of claim 15, wherein the one or more unscheduled traffic queues comprise a plurality of unscheduled traffic queues, and the method further comprising using unscheduled packet priority rules to select unscheduled packets from the heads of the plurality of unscheduled traffic queues for transmission.

18. The method of claim 15, wherein the one or more scheduled traffic queues comprise a plurality of scheduled traffic queues, and the method further comprising using scheduled packet priority rules to select a scheduled packet from the plurality of scheduled traffic queues in situations where the scheduled transmit times for packets from two or more scheduled traffic queues conflict.

* * * * *